United States Patent
Mikami

(10) Patent No.: US 9,641,475 B2
(45) Date of Patent: May 2, 2017

(54) ELECTRONIC MAIL RECEIVING DEVICE AND METHOD

(75) Inventor: Hiroshi Mikami, Tokyo (JP)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 372 days.

(21) Appl. No.: 14/119,243

(22) PCT Filed: Apr. 5, 2012

(86) PCT No.: PCT/JP2012/002405
§ 371 (c)(1),
(2), (4) Date: Nov. 21, 2013

(87) PCT Pub. No.: WO2012/164806
PCT Pub. Date: Dec. 6, 2012

(65) Prior Publication Data
US 2014/0173006 A1    Jun. 19, 2014

(30) Foreign Application Priority Data

Jun. 3, 2011  (JP) ................................ 2011-125650
Jun. 3, 2011  (JP) ................................ 2011-125651

(51) Int. Cl.
G06F 15/16   (2006.01)
H04L 12/58   (2006.01)
G06Q 10/10   (2012.01)

(52) U.S. Cl.
CPC ........... H04L 51/26 (2013.01); G06Q 10/107 (2013.01)

(58) Field of Classification Search
CPC ...... G06Q 10/107; H04L 12/585; H04L 12/58
See application file for complete search history.

(56) References Cited

U.S. PATENT DOCUMENTS

| | | | | |
|---|---|---|---|---|
| 6,160,497 A | * | 12/2000 | Clark | ........................ G01S 7/04 340/945 |
| 7,712,034 B2 | * | 5/2010 | Gusmorino | ....... G06F 17/30905 715/746 |
| 8,578,261 B1 | * | 11/2013 | Gupta | ............... G06F 17/30899 715/205 |
| 2002/0112018 A1 | | 8/2002 | Kaminagayoshi | |
| 2002/0116401 A1 | | 8/2002 | Kashito et al. | |
| 2004/0172453 A1 | | 9/2004 | De Mendonca et al. | |
| 2007/0038718 A1 | * | 2/2007 | Khoo | ................... G06Q 10/107 709/206 |
| 2008/0021966 A1 | * | 1/2008 | Asami | .................. G06Q 10/107 709/206 |
| 2009/0052349 A1 | * | 2/2009 | Matsuo | ............... H04L 12/2869 370/254 |
| 2009/0307306 A1 | * | 12/2009 | Jalon | ................. G06F 17/30126 709/203 |
| 2010/0011079 A1 | * | 1/2010 | Hitchcock | ............ G06Q 10/107 709/206 |

(Continued)

FOREIGN PATENT DOCUMENTS

JP   2002-323998 A   11/2002
JP   2003-167826 A   6/2003

(Continued)

OTHER PUBLICATIONS

International Search Report and Written Opinion dated Jun. 12, 2012 from the corresponding PCT/JP2012/002405.

(Continued)

Primary Examiner — Philip Chea
Assistant Examiner — Van Kim T Nguyen
(74) Attorney, Agent, or Firm — Katten Muchin Rosenman LLP

(57) ABSTRACT

A preview generating section 104 generates preview forming data within a predetermined data size by extracting at least a part of header information and at least a part of a mail body from an electronic mail obtained by a mail obtaining section 102. A cache section 142 caches the preview forming data. A display section 108 displays a preview list on a display device 68 using the preview forming data cached by the cache section 142. When a preview included in the preview list is selected, a command transmitting section 106 requests a server to transmit the electronic mail identified by the selected preview.

6 Claims, 11 Drawing Sheets

(56) References Cited

U.S. PATENT DOCUMENTS

| | | | | |
|---|---|---|---|---|
| 2011/0216981 A1* | 9/2011 | Hiraga | ................. | H04N 19/176 |
| | | | | 382/233 |
| 2012/0084644 A1* | 4/2012 | Robert | .............. | G06F 17/30126 |
| | | | | 715/255 |
| 2012/0215804 A1* | 8/2012 | Christensen | ........ | G06F 17/3056 |
| | | | | 707/769 |

FOREIGN PATENT DOCUMENTS

| | | | |
|---|---|---|---|
| JP | 2004-318866 A | 11/2004 | |
| JP | 2004-536507 A | 12/2004 | |
| JP | 2008-250437 A | 10/2008 | |
| JP | 2009-15642 A | 1/2009 | |
| WO | 03/003263 A2 | 1/2003 | |

OTHER PUBLICATIONS

Translation of International Preliminary Report on Patentability dated Dec. 4, 2013 from corresponding Application No. PCT/JP2012/002405.

* cited by examiner

ELECTRONIC MAIL RECEIVING DEVICE AND METHOD

TECHNICAL FIELD

The present invention relates to a technology for processing electronic mails.

BACKGROUND ART

Small electronic devices having various functions, such as smart phones, portable type game machines, and the like have recently spread. Some of these electronic devices have an electronic mail transmitting and receiving function, thereby allowing a user to view electronic mails easily even outdoors.

CITATION LIST

Patent Literature

[PTL 1]
US 2002/0,112,018 A1

SUMMARY

Technical Problems

Generally, when a mail application included in a portable type electronic device has downloaded electronic mails, the mail application generates previews of the electronic mails, and displays a preview list on a display. When a user selects a preview from the preview list, the mail application displays the body of the electronic mail corresponding to the preview on the display.

Portable type electronic devices have a lower storage capacity than stationary type electronic devices. Therefore, in a portable type electronic device, an upper limit is often set to the number of electronic mails to be downloaded from a mail server so as to prevent the size of received data from being increased. Generally, the upper limit number is about a few tens, which cannot be said to provide usability for users receiving hundreds of electronic mails a day.

In addition, there is a mail application function that allows a setting to be made so as to sort electronic mails from a particular sender into a particular folder. When such a setting is made, electronic mails can be classified by sender, which is convenient when the user searches for a mail. However, as compared with stationary type electronic devices, portable type electronic devices cannot be said to have a fully enhanced input interface, and therefore even a sort setting takes time. In addition, because portable type electronic devices offer ease of use as a feature, it is desirable to be able to provide a mechanism such that a plurality of related electronic mails can be viewed easily.

It is accordingly an object of the present invention to provide an improved mail application.

Solution to Problems

In order to solve the above problems, according to a mode of the present invention, there is provided an electronic mail receiving device including: a mail obtaining section configured to obtain an electronic mail; a preview generating section configured to generate preview forming data within a predetermined first data size from the electronic mail obtained by the mail obtaining section; a cache section configured to cache the preview forming data generated by the preview generating section; a display section configured to display a preview list on a display using the preview forming data cached by the cache section; and a command transmitting section configured to, when a preview included in the preview list is selected, request a server to transmit the electronic mail identified by the selected preview.

In addition, according to another mode of the present invention, there is provided an electronic mail receiving device including: a mail obtaining section configured to obtain electronic mails including header information and a mail body; a grouping section configured to identify electronic mails that are obtained by the mail obtaining section and include an identical set of a mail address of a sender and a mail address of a destination in the header information of the electronic mails; and a display section configured to display the mail bodies of the electronic mails identified by the grouping section in a message display region of a display.

It is to be noted that arbitrary combinations of the above-described constituent elements and methods, devices, systems, recording media, computer programs, and the like to which expressions of the present invention are converted are also effective as modes of the present invention.

Advantageous Effect of Invention

According to the information processing technology according to the present invention, an improved mail application can be provided.

DESCRIPTION OF EMBODIMENTS

Figure 1:
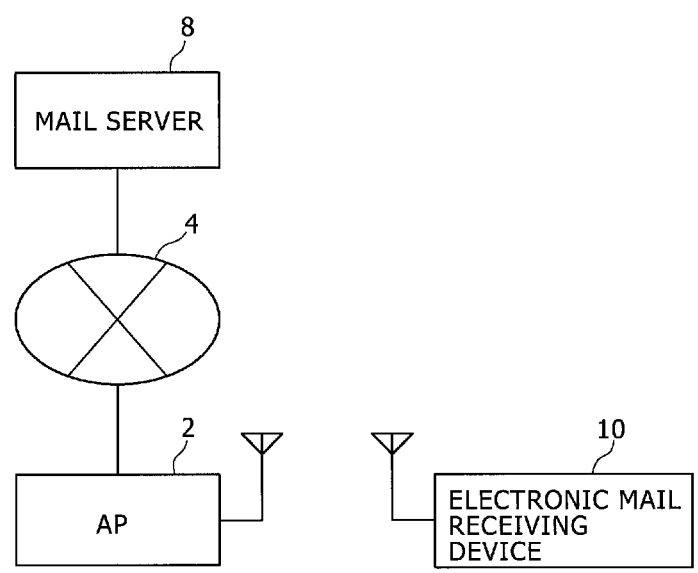
FIG. 1 is a diagram showing an information processing system according to an embodiment of the present invention.

FIG. 1 shows an information processing system 1 according to an embodiment of the present invention. The information processing system 1 includes an electronic mail receiving device 10 as a user terminal and a mail server 8. The electronic mail receiving device 10 in the present embodiment is a portable type electronic device having a wireless communication function. The electronic mail receiving device 10 is connected to a network 4 via an access point (hereinafter referred to as an "AP") 2 to receive electronic mail from the mail server 8. The AP 2 functions as a relay device that connects the electronic mail receiving device 10 to the network 4 by a wireless LAN (Local Area Network). The electronic mail receiving device 10 may have a communicating function using a wireless LAN system, but may be connected to a mobile telephone network by a mobile telephone communicating system such as a third-generation mobile communication system or the like to receive electronic mail from the mail server 8. Incidentally, the electronic mail receiving device 10 may have a wireless communication function using another system, and may receive electronic mail from the mail server 8 by wire communication.

The electronic mail receiving device 10 implements an electronic mail transmitting and receiving function and an electronic mail display function by starting a mail application. Incidentally, the electronic mail transmitting and receiving function may be implemented by starting the mail application in the background. The electronic mail receiving device 10 may be for example a mobile telephone, a PDA (Personal Digital Assistant), or a portable type game machine, and it suffices for any of the electronic devices to include the mail application. Incidentally, while the mail application in the present embodiment is useful particularly in an electronic device having a low storage capacity, the mail application in the present embodiment can also be used effectively in an electronic device having a high storage capacity, for example a stationary type game machine. In the following, a case where the electronic mail receiving device 10 is a portable type game machine including the mail application in the present embodiment will be taken as an example.

Figure 2:
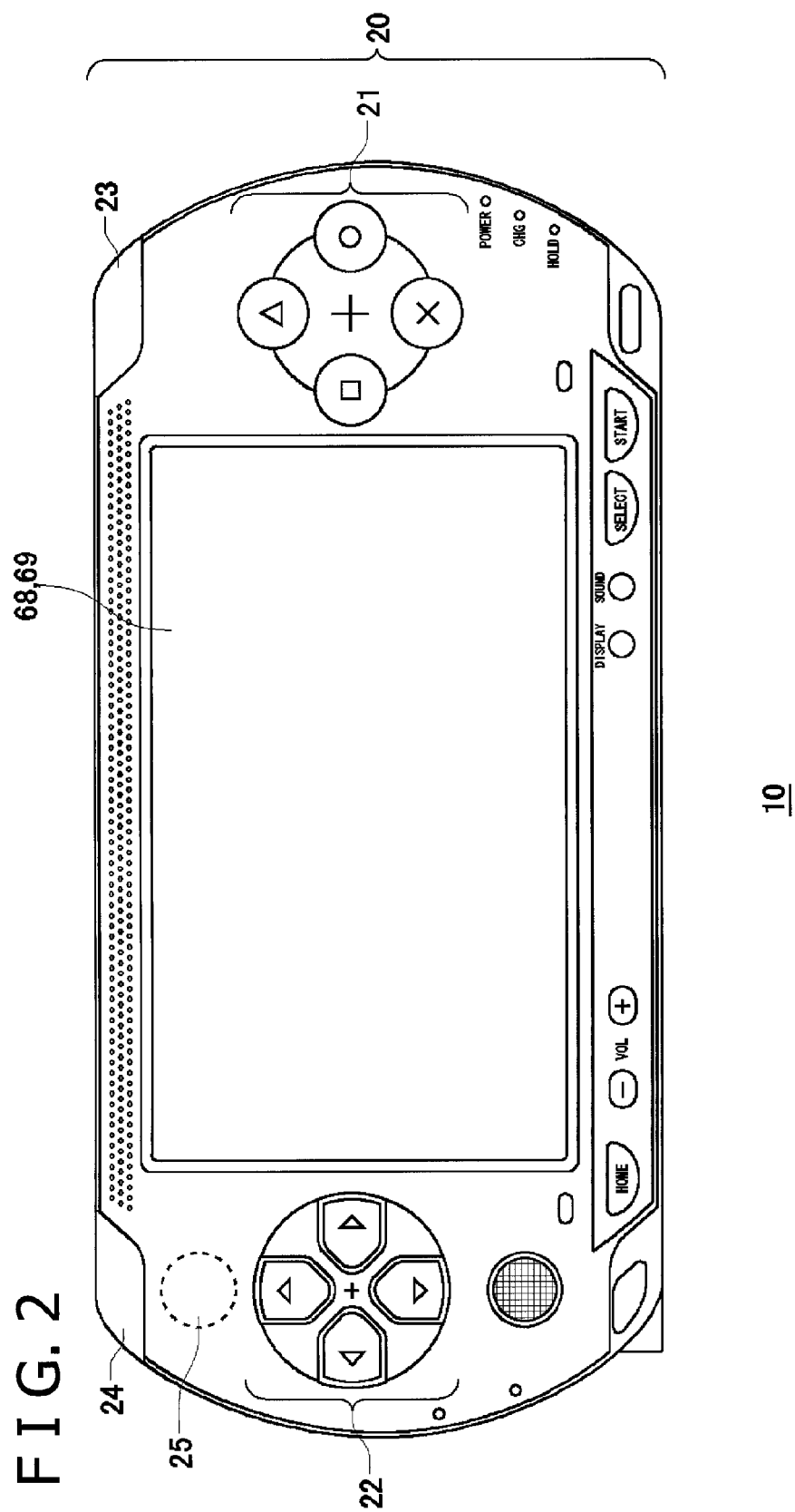
FIG. 2 is a diagram showing an example of an external appearance of an electronic mail receiving device according to the embodiment.

FIG. 2 shows an example of an external appearance of the electronic mail receiving device 10 according to the present embodiment. The front side of the electronic mail receiving device 10, that is, a side facing a user when the user holds and operates the electronic mail receiving device 10 is provided with an input device 20 including an instruction input button 21, a direction key 22, an R-button 23, an L-button 24, and the like and a display device 68. A touch panel 69 for detecting a touch by a finger of the user or a stylus pen is annexed to the display device 68. The electronic mail receiving device 10 has therewithin a motion sensor 25 for detecting the inclination of the electronic mail receiving device 10. Incidentally, a back surface touch panel may be provided to the rear side of the electronic mail receiving device 10.

A housing portion such for example as a slot (not shown) for loading a recording medium such as a memory card or the like is provided in a side surface of the electronic mail receiving device 10. In addition, a housing portion such for example as a slot (not shown) for loading a recording medium on which a game file is recorded is provided in a side surface of the electronic mail receiving device 10.

The user can for example operate the instruction input button 21 with a thumb of a right hand, operate the direction key 22 with a thumb of a left hand, operate the R-button 23 with an index finger or a middle finger of the right hand, and operate the L-button 24 with an index finger or a middle finger of the left hand, in a state of holding the electronic mail receiving device 10 with both the hands. In addition, when the touch panel 69 is operated, the touch panel 69 may be operated with the thumbs of the respective hands in a state of the electronic mail receiving device 10 being held by both the hands, or the touch panel 69 may be operated with the right hand in a state of the electronic mail receiving device 10 being held by the left hand.

Figure 3:
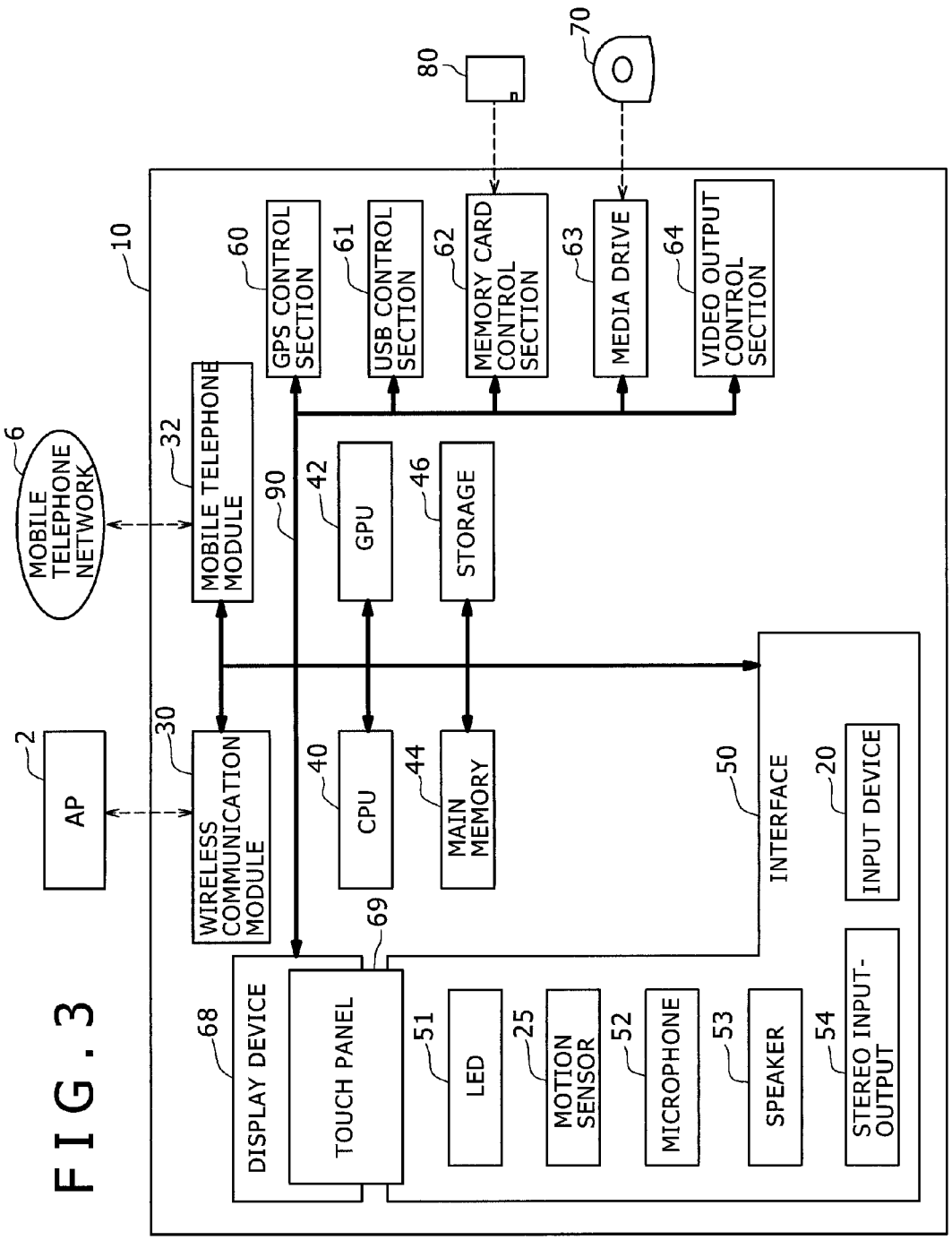
FIG. 3 is a functional block diagram of the electronic mail receiving device.

FIG. 3 is a functional block diagram of the electronic mail receiving device 10. The display device 68 displays an image generated by functions of the electronic mail receiving device 10. The display device 68 may be a liquid crystal display device, or may be an organic EL display device. The touch panel 69 is provided so as to be superposed on the display device 68, and detects a touch by a finger of the user, the pen, or the like. The touch panel 69 may be of any type such as a resistive film type, a surface capacitive type, a projected capacitive type, or the like. In the electronic mail receiving device 10, a display is formed by the display device 68 and the touch panel 69.

A wireless communication module 30 is formed by a wireless LAN module compliant with a communication standard such as an IEEE 802.11b/g standard or the like. The wireless communication module 30 is connected to the network 4 via the AP 2. A mobile telephone module 32 supports a 3rd-generation digital mobile telephone system compliant with an IMT-2000 (International Mobile Telecommunication 2000) standard defined by an ITU (International Telecommunication Union). The mobile telephone module 32 is connected to a mobile telephone network 6. A SIM card in which a unique ID number for identifying the telephone number of the mobile telephone is recorded is inserted into the mobile telephone module 32.

In an interface 50, an LED (Light Emitting Diode) 51 blinks when the wireless communication module 30, the mobile telephone module 32, or the like is transmitting or receiving data. The motion sensor 25 detects the motion of the electronic mail receiving device 10. A microphone 52 inputs sound in the vicinity of the electronic mail receiving device 10. A speaker 53 outputs sound generated by functions of the electronic mail receiving device 10. A stereo input-output terminal 54 inputs stereo sound from an external microphone, and outputs stereo sound to external headphones or the like. The input device 20 includes the above-described operating keys and the like, and receives operating input by the user.

A CPU (Central Processing Unit) 40 executes a program loaded in a main memory 44 or the like, and executes the mail application in the present embodiment. A GPU (Graphics Processing Unit) 42 performs calculation necessary for image processing. The main memory 44 is formed by a RAM (Random Access Memory) or the like, and stores a program operating on the electronic mail receiving device 10, data, and the like. A storage 46 is formed by a NAND type flash memory or the like, and is used as a built-in type auxiliary storage device.

A GPS (Global Positioning System) control section 60 receives a signal from a GPS satellite, and calculates a present position. A USB control section 61 controls communication with a peripheral device connected by a USB (Universal Serial Bus). A video output control section 64 outputs a video signal to an external display device on the basis of a standard such as HDMI or the like. A memory card control section 62 controls the reading and writing of data from and to a recording medium 80 such as a flash memory or the like loaded in a housing portion (not shown) such as a slot or the like. When a removable recording medium 80 is loaded into the housing portion, the recording medium 80 is used as an external type auxiliary storage device. A media drive 63 is a housing portion loaded with a game recording medium 70 on which a game file is recorded. The media drive 63 controls the reading and writing of data from and to the game recording medium 70. The above functional blocks are connected to each other by a bus 90.

Before the mail application according to the present embodiment is described, basic operation of POP (Post Office Protocol) 3 will be described in the following. POP3 includes three procedures of an authentication, a transaction, and an update.

In the authentication procedure, first, a client transmits a user ID to a mail server. The mail server identifies a mailbox on the basis of the user ID. Next, the client transmits a password to the mail server. The mail server validates and authenticates the user on the basis of the password. When the authentication has been performed successfully, the transaction procedure is started.

Figure 4:
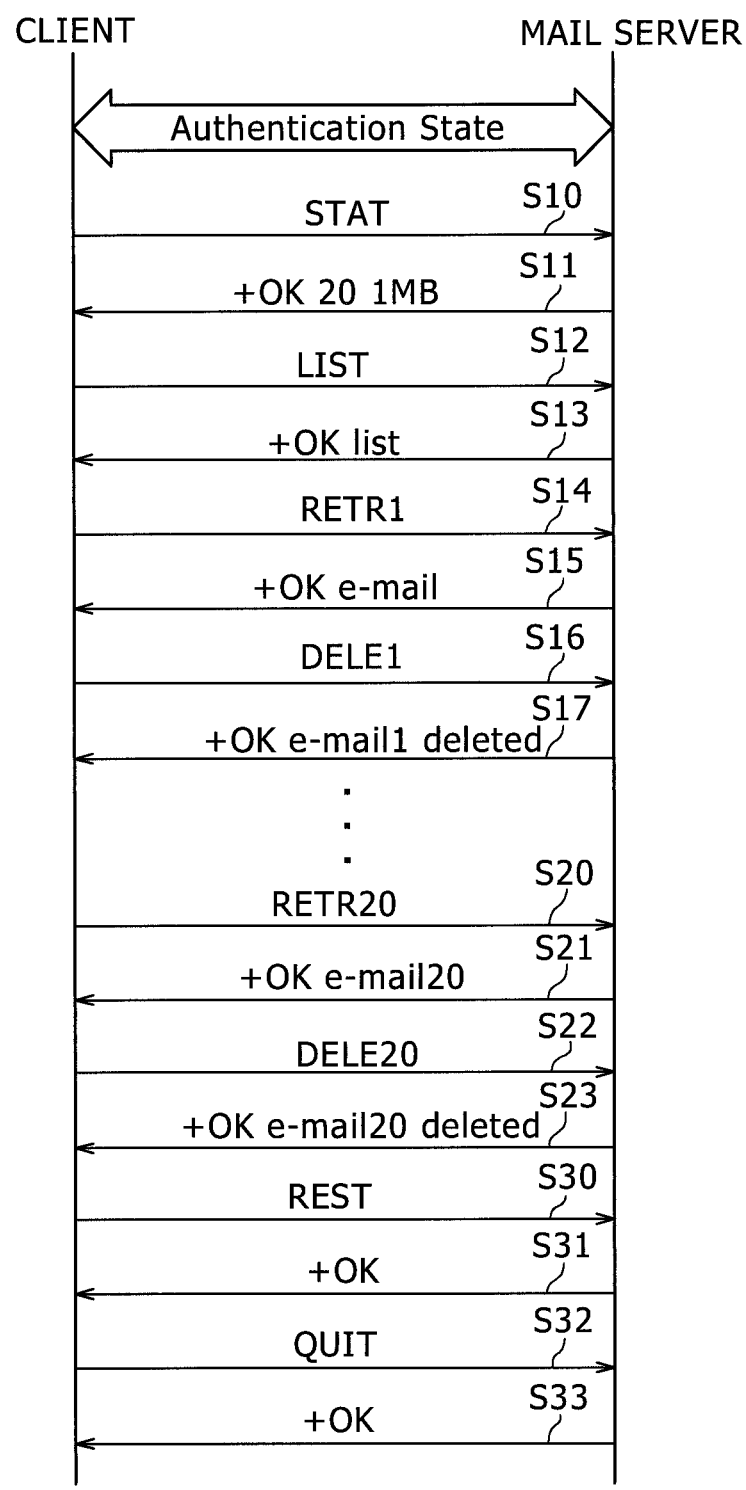
FIG. 4 is a sequence diagram of a transaction procedure and an update procedure performed after an authentication procedure.

FIG. 4 is a sequence diagram of the transaction procedure and the update procedure performed after the authentication procedure. In FIG. 4, steps S10 to S23 represent the transaction procedure, and steps S30 to S33 represent the update procedure. Incidentally, the following sequence is an example of the basic operation of POP3.

<Transaction Procedure>

(S10)

The client transmits a STAT command to the mail server.

(S11)

The mail server returns the number of electronic mails in the mailbox and a total number of bytes of the electronic mails to the client. "20 1MB" indicates that the total number of electronic mails is 20 and that the total number of bytes is 1 MB (megabyte).

(S12)

The client transmits a LIST command to the mail server.

(S13)

In the mailbox of the mail server, message numbers starting at one are assigned in order of arrival of the electronic mails. Receiving the LIST command, the mail server returns a message list (list) including the message number and the number of bytes of each electronic mail to the client. Suppose in this case that message numbers 1 to 20 are assigned to 20 electronic mails, respectively.

(S14)

The client transmits a RETR command to the mail server. Here, "RETR1" means a request to obtain the electronic mail having message number 1.

(S15)

The mail server transmits the electronic mail having message number 1 to the client. The client can thereby obtain the electronic mail having message number 1.

(S16)

The client transmits a DELE command to the mail server. Here, "DELE1" is a command to attach a deletion mark to the electronic mail having message number 1.

(S17)

The mail server attaches a deletion mark to the electronic mail having message number 1. It is to be noted that a deletion mark is only attached, and that the deletion of the electronic mail is not performed yet.

The client obtains all of the electronic mails accumulated in the mailbox by transmitting RETR commands and DELE commands while specifying all of the message numbers included in the message list. In addition, a deletion mark is attached to all of the electronic mails accumulated in the mailbox.

(S20)

The client transmits a RETR command to the mail server. Here, "RETR20" means a request to obtain the electronic mail having message number 20.

(S21)

The mail server transmits the electronic mail having message number 20 to the client. The client can thereby obtain the electronic mail having message number 20.

(S22)

The client transmits a DELE command to the mail server. Here, "DELE20" is a command to attach a deletion mark to the electronic mail having message number 20.

(S23)

The mail server attaches a deletion mark to the electronic mail having message number 20. This concludes the transaction procedure.

<Update Procedure>

(S30)

The client transmits a REST command to the mail server. The REST command is a command to remove the deletion mark attached to an electronic mail in the mailbox. When the obtained electronic mail is desired not to be deleted from the mailbox, the client can leave the obtained electronic mail in the mailbox by transmitting the REST command.

(S31)

The mail server removes the deletion mark of the electronic mail.

(S32)

The client transmits a QUIT command to the mail server. The QUIT command is a command to delete electronic mails having a deletion mark attached thereto from the mailbox, and disconnect a TCP connection.

(S33)

The mail server deletes the electronic mails having a deletion mark attached thereto from the mailbox. When the REST command is transmitted in S30, the deletion mark is removed from the electronic mail, and therefore the electronic mail in the mailbox is left without being deleted. The electronic mail receiving device 10 according to the present embodiment is a portable type terminal device, and is assumed to be used in a case where the user checks electronic mails outdoors as a use case. Therefore, the electronic mail receiving device 10 is desirably set to transmit the REST command to leave the electronic mails in the mailbox.

This concludes the update procedure. The TCP connection between the client and the mail server is thereafter disconnected.

Incidentally, in the present embodiment, a setting is made to leave the electronic mails in the mailbox, and thus S16, S17, S22, S23, S30, and S31 as steps relating to deletion marks may be omitted from the sequence.

Incidentally, according to the basic sequence shown in FIG. 4, the client receives all of the electronic mails accumulated in the mailbox. Then, a situation occurs in which the same electronic mails are received many times. Therefore the client desirably distinguishes obtained electronic mails from new electronic mails that have arrived in the mailbox, and receives only the new electronic mails. For this purpose, POP3 provides a UIDL command.

In the sequence shown in FIG. 4, the UIDL command is transmitted to the mail server before the client transmits the RETR command (that is, before S14). The mail server adds an ID for uniquely identifying each of the electronic mails accumulated in the mailbox to the electronic mail in advance. Receiving the UIDL command, the mail server transmits a correspondence list associating the message numbers with the electronic mail IDs to the client. When the client thereafter transmits the RETR command, and obtains the electronic mails, the client records the IDs of the obtained electronic mails. The client obtains the electronic mail IDs by the UIDL command also at a time of a next access, and thereby obtains only electronic mails having IDs not obtained the previous time by the RETR command. This prevents the same electronic mails from being obtained repeatedly.

The electronic mail receiving device 10 according to the present embodiment receives electronic mails from the mail server 8 using the mechanism of POP3. In the electronic mail receiving device 10, the mail application accumulates received electronic mails on the recording medium 80. The recording medium 80 has a storage capacity of a few GB (gigabytes). If the electronic mail receiving device 10 executes only the mail application, the capacity of the recording medium 80 can be said to be sufficient. However, because the electronic mail receiving device 10 according to the present embodiment is a game machine, a game program downloaded from a game server, saved data of a game, and the like are also recorded on the recording medium 80. It is therefore not desirable that the mail application should use the recording medium 80 without any limitation.

The electronic mail receiving device 10 accordingly limits a storage capacity allocated to the mail application. The available capacity is for example 10 MB. The mail application has a function of effectively presenting electronic mails to the user while making effective use of the capacity of 10 MB.

(First Embodiment)

In a first embodiment, a mail application for presenting received electronic mails to the user is provided. When this mail application is started, the mail application displays a preview list of the electronic mails on a display. Each mail preview is displayed including for example a subject, a sender, a date and time of transmission, and a part of a mail body (message). When the user views the preview list and selects the preview of an electronic mail that the user desires to read, the mail application displays the body of the selected electronic mail on the display.

The mail application receives electronic mails according to POP3. However, when the sequence shown in FIG. 4 is adopted as it is, all of the electronic mails accumulated in the mailbox (all of unread electronic mails when the UIDL command is used) are obtained, and therefore the size of received data is increased. For this reason, a conventional mail application decreases the size of data stored in a portable type electronic terminal by limiting the number of electronic mails to be downloaded. The conventional mail application limits the number of electronic mails to be downloaded to about a few tens, and thus has a problem of consequently being able to present, to the user, only a number of previews generated from downloaded electronic mails which number is equal to the number of the downloaded electronic mails.

Accordingly, when the mail application according to the first embodiment receives an electronic mail, the mail application generates and caches preview forming data from at least a part of header information and at least a part of a mail body, and discards the received electronic mail after generating the preview forming data. That is, even when an electronic mail is received once, the electronic mail is used only to generate preview forming data, and the electronic mail itself is not recorded on the recording medium 80. In addition, because of a small size of preview forming data, even when a few hundred to a few thousand pieces of preview forming data are cached, the data size of the preview forming data is significantly smaller than in a case where full text is received. This can reduce an amount of data recorded on the recording medium 80, and increase the number of previews included in the preview list, thus enhancing the convenience of the mail application. Incidentally, when an electronic mail is received to generate preview forming data, an amount of downloaded data may be reduced by aborting the reception of the electronic mail at a point in time when the header information of the electronic mail and a message of a predetermined number of lines are downloaded, by using a TOP command.

Figure 5:
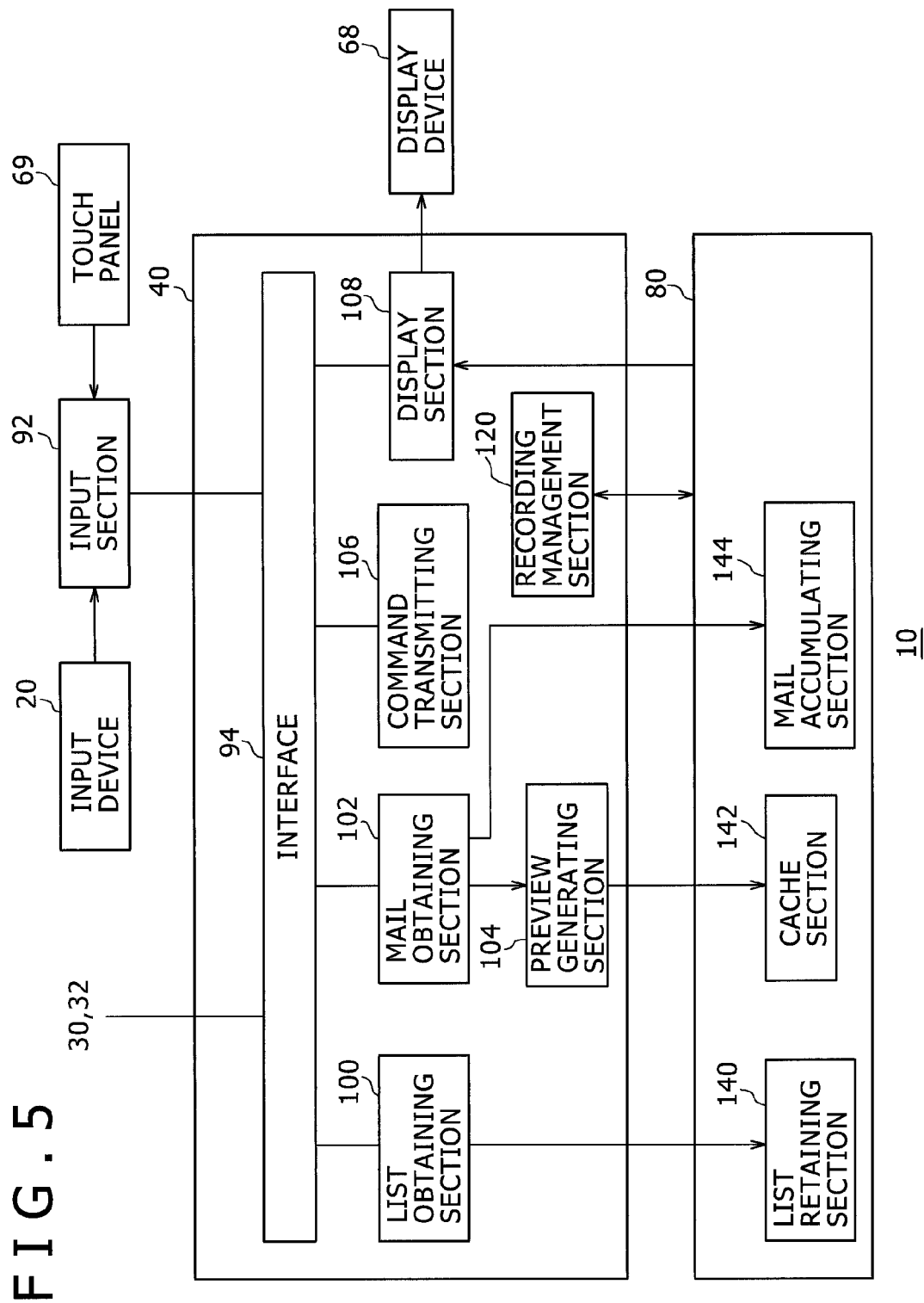
FIG. 5 is a diagram showing functional blocks for performing an electronic mail receiving function in the electronic mail receiving device according to the first embodiment.

FIG. 5 shows functional blocks for performing an electronic mail receiving function in the electronic mail receiving device 10 according to the first embodiment. FIG. 5 does not show the main memory 44, the GPU 42, or the like. The electronic mail receiving device 10 includes the input device 20, the touch panel 69, an input section 92, the CPU 40, the recording medium 80, and the display device 68. These configurations are implemented, in terms of hardware components, by the CPU of an arbitrary computer, a memory, a program loaded in the memory, and the like. In this case, however, the functional blocks implemented by cooperation of these components are depicted. Hence, it is to be understood by those skilled in the art that these functional blocks can be implemented in various forms by only hardware, only software, or a combination thereof.

The input section 92 receives operating instructions from the user which instructions are input from the input device 20 and the touch panel 69. The recording medium 80 records thereon data used by the mail application. Incidentally, another recording device, for example the storage 46 may be used in place of the recording medium 80.

The CPU 40 includes an interface 94, a list obtaining section 100, a mail obtaining section 102, a preview generating section 104, a command transmitting section 106, a display section 108, and a recording management section 120. The respective functions of the interface 94, the list obtaining section 100, the mail obtaining section 102, the preview generating section 104, the command transmitting section 106, and the display section 108 are implemented by the mail application. The recording management section 120 manages conditions of use of the recording medium 80 by the mail application so as to prevent the capacity used by the mail application from exceeding an upper limit (for example 10 MB). Incidentally, as will be described later, the electronic mail receiving device 10 includes not only the mail application according to the first embodiment but also a mail application according to a second embodiment. The recording management section 120 manages the conditions of use of the recording medium 80 by the plurality of mail applications, and monitors so as to prevent a total capacity being used from exceeding the upper limit.

When the input section 92 receives a mail application starting instruction, the mail application according to the first embodiment is started, and the command transmitting section 106 performs the authentication procedure shown in FIG. 4. After the authentication procedure is ended, the command transmitting section 106 transmits the STAT command shown in S10 and the LIST command shown in S12 from the wireless communication module 30 to the mail server 8 via the interface 94. The command transmitting section 106 also transmits the UIDL command.

The list obtaining section 100 obtains a message list (list) including the message number and the number of bytes of each electronic mail from the mail server 8. The list obtaining section 100 also obtains a correspondence list of electronic mail IDs and message numbers which correspondence list is transmitted from the mail server 8 in response to the UIDL command. The list obtaining section 100 records the message list and the correspondence list in a list retaining section 140.

The command transmitting section 106 refers to the lists recorded in the list retaining section 140, and transmits the RETR command shown in S14 in FIG. 4 from the wireless communication module 30 to the mail server 8 via the interface 94. The RETR command includes the message number of an electronic mail. The mail server 8 extracts the electronic mail having the message number included in the RETR command from the mailbox, and transmits the electronic mail to the electronic mail receiving device 10.

The mail obtaining section 102 obtains the electronic mail including header information and a mail body. The mail obtaining section 102 passes the obtained electronic mail to the preview generating section 104. The preview generating section 104 generates preview forming data from the electronic mail. Specifically, the preview generating section 104 generates the preview forming data within a predetermined data size by extracting at least a part of the header information and at least a part of the mail body from the electronic mail. The preview forming data is data displayed on the display device 68 to form a preview of the mail. The preview generating section 104 in the present embodiment generates the preview forming data by extracting a subject (Subject), a sender (From), and a date and time of transmission (Date) from the header information and extracting text within a predetermined number of characters from the mail body. The preview forming data is cached in a cache section 142. Incidentally, the preview generating section 104 may extract a destination (To or Cc) from the header information, and include the destination in the preview forming data.

After generating the preview forming data, the preview generating section 104 discards the electronic mail obtained by the mail obtaining section 102. That is, the electronic mail obtained by the mail obtaining section 102 at the time of generation of the preview forming data is used to generate the preview forming data, and is not accumulated in a mail accumulating section 144 of the recording medium 80 after being used. This eliminates a need to record electronic mails whose mail bodies may be read or may not be read by the user.

The command transmitting section 106 refers to the lists recorded in the list retaining section 140, and transmits a RETR command and a DELE command for an electronic mail not yet obtained to the mail server 8. The preview generating section 104 generates preview forming data on the basis of the electronic mail obtained by the mail obtaining section 102. The cache section 142 caches the generated preview forming data.

The preview generating section 104 limits the size of the preview forming data to 2 KB (kilobytes) or less, for example. The capacity of the recording medium 80 which capacity is allocated to the mail application is for example 10 MB. However, not only the cache section 142 but also the list retaining section 140 retaining the lists, the mail accumulating section 144 accumulating electronic mails, and the like are formed on the recording medium 80. Therefore the capacity used as a whole needs to be limited to 10 MB by reducing the capacity used by each of the list retaining section 140, the cache section 142, and the mail accumulating section 144. Therefore, the capacity used by the cache section 142 is desirably reduced by setting the size of the preview forming data to a predetermined value or less. For such a reason, the preview forming data may be limited to an even smaller data size (for example 512 bytes or 256 bytes) or less.

An upper limit is desirably set also to the number of pieces of preview forming data cached by the cache section 142. When a preview list is displayed on the display device 68, the user scrolls the preview list by operating the touch panel 69. Though depending on the user, about 200 previews that can be scrolled are considered to be sufficient as a received message list. The cache section 142 is accordingly made able to cache up to 200 pieces of preview forming data. Incidentally, when the user is to view a preview not cached in the cache section 142, that is, when the user is to view previews whose number exceeds 200, the command transmitting section 106 in arbitrary timing refers to the lists recorded in the list retaining section 140 and transmits the RETR command to the mail server 8, and the preview generating section 104 generates preview forming data. At this time, the preview generating section 104 desirably deletes preview forming data from the cache section 142 so as to prevent the number of pieces of data cached in the cache section 142 from exceeding the upper limit (200) by a cache algorithm typified by an LRU (Least Recently Used) system or the like. This can reduce the capacity used by the cache section 142 to 400 KB (=2 KB×200) or less. Incidentally, when there is available capacity left on the recording medium 80, the cache section 142 may cache a number of pieces of preview forming data which number exceeds 200.

As described above, the size of preview forming data is limited to 2 KB or less. Therefore, if one electronic mail has a data size of 1 MB, it is not efficient in terms of time to generate preview forming data after downloading all of 1 MB. In addition, downloading all of 1 MB means that a storage capacity is wasted at the time of the download even though the data is discarded after all. In addition, downloading all of 1 MB is undesirable also from a viewpoint of power consumption because the electronic mail receiving device 10 is a battery-driven terminal device.

Accordingly, the mail obtaining section 102 may be made to obtain an electronic mail within the range of a predetermined data size from a start, and not to obtain a part by which the electronic mail exceeds the range. The preview forming data is generated from a part of the header information and a part of the mail body. The header information is disposed at a starting portion of the electronic mail, and it suffices to extract text entered at the beginning of the body part from the mail body. Accordingly, when for example data of the electronic mail which data has a size of about 2.5 KB to 3 KB can be obtained from the start, the data is sufficient to generate preview forming data of 2 KB or less. Accordingly, the mail obtaining section 102 limits the size of the electronic mail to be obtained to about 2.5 KB, for example, and does not obtain a part by which the electronic mail exceeds 2.5 KB.

An example of a method for limiting the size of the electronic mail to be obtained to about 2.5 KB will be shown. As an example, the mail obtaining section 102 specifies the number of lines of the message body which lines are to be downloaded in advance using the TOP command. The mail obtaining section 102 can thereby abort the reception of the electronic mail at a point in time when the header of the electronic mail and a message of a predetermined number of lines are downloaded. Incidentally, the TOP command is used only at the time of obtainment of the electronic mail for the generation of preview forming data. Though not shown, the mail application has a function of managing a status as to whether the mail obtaining section 102 is obtaining the electronic mail for the generation of preview forming data or whether the mail obtaining section 102 is obtaining the electronic mail for display of the message body. The number of lines of the mail body which lines are to be downloaded is set by this function at the time of obtainment of the electronic mail for the generation of preview forming data.

As another example, the interface 94 may forcefully terminate a TCP session when an amount of received data exceeds a set data size (2.5 KB). The forceful termination of the TCP session may be performed by the interface 94, or may be controlled by the mail obtaining section 102. When the mail obtaining section 102 thus obtains an electronic mail having a data size necessary to generate preview forming data at the time of generation of the preview forming data, the efficiency of generation of the preview forming data can be enhanced.

Figure 6:
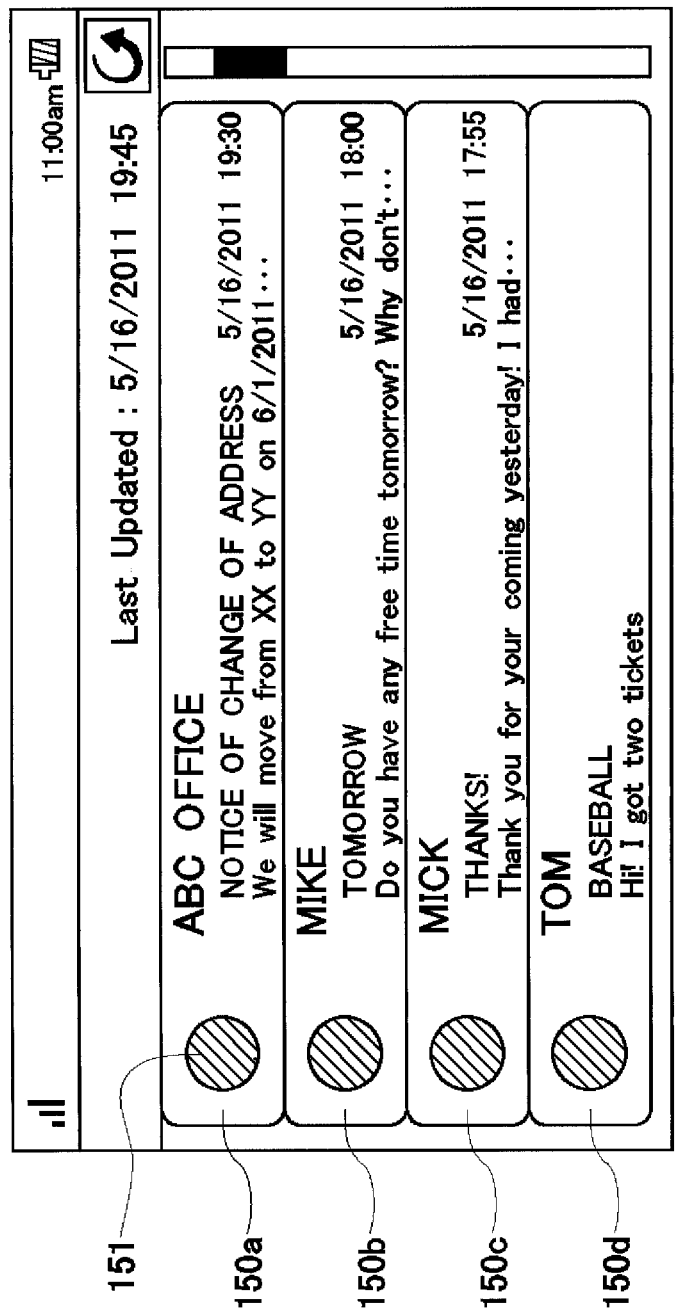
FIG. 6 is a diagram showing an example of display of a preview list.

The display section 108 displays a preview list on the display device 68 using the preview forming data cached by the cache section 142. FIG. 6 shows an example of display of the preview list. The preview list includes a plurality of previews 150a, 150b, 150c, and 150d. In FIG. 6, an unread mark 151 indicating that a mail body is not obtained is added to all of the previews 150. When one of the previews 150 is selected, the mail obtaining section 102 obtains the whole of the electronic mail, and the display section 108 displays the whole of the electronic mail on the display device 68, for example, the unread mark 151 is removed.

When the user scrolls the preview list by flicking the touch panel 69 in a vertical direction, the previews being displayed are changed. The user selects the preview 150 of an electronic mail that the user desires to view by tapping. When the preview is selected, the command transmitting section 106 transmits the RETR command requesting the transmission of the electronic mail identified by the selected preview to the mail server 8. Specifically, the command transmitting section 106 obtains the message number corresponding to the selected preview from the list retaining section 140, includes the message number in the RETR command, and transmits the RETR command to the mail server 8.

Obtaining the electronic mail from the mail server 8, the mail obtaining section 102 records the electronic mail in the mail accumulating section 144. The display section 108 displays the mail body on the display device 68. Thus, in the mail application according to the first embodiment, the electronic mails accumulated in the mail accumulating section 144 are limited to electronic mails downloaded according to a viewing request from the user after the generation of the preview list. Therefore the capacity used by the mail accumulating section 144 can be reduced.

The recording management section 120 monitors conditions of use of the recording medium 80, and records a time that stored contents are referred to and the like. When the capacity being used approaches the predetermined upper limit capacity (10 MB), the recording management section 120 increases available capacity by deleting data on the recording medium 80 by a cache algorithm typified by an LRU (Least Recently Used) system, for example.

Figure 7:
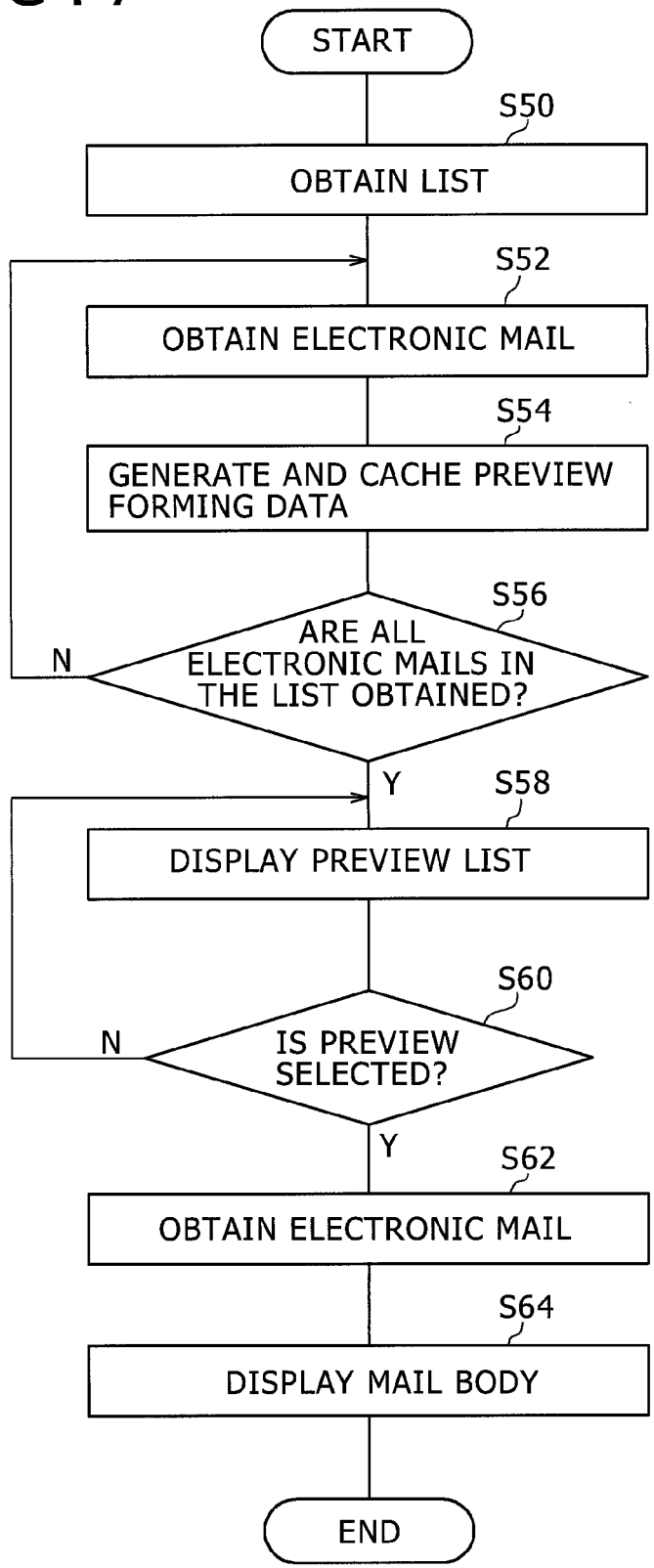
FIG. 7 is a flowchart of a mail display process by a mail application according to the first embodiment.

FIG. 7 is a flowchart of a mail display process by the mail application according to the first embodiment. The list obtaining section 100 obtains a message list of electronic mails accumulated in the mailbox from the mail server 8, and makes the list retaining section 140 retain the message list (S50). The mail obtaining section 102 transmits the RETR command, and obtains an electronic mail from the mail server 8 (S52). At this time, the mail obtaining section 102 obtains the electronic mail within a predetermined data size from the start of the data. The preview generating section 104 generates preview forming data by extracting at least a part of the header information and at least a part of the mail body from the electronic mail, and makes the cache section 142 cache the preview forming data (S54). Steps S52 and S54 are repeated (N in S56).

When the mail obtaining section 102 has obtained all of the electronic mails included in the message list, and the preview generating section 104 has generated preview forming data (Y in S56), the display section 108 displays a preview list on the display device 68 using the preview forming data cached in the cache section 142 (S58). Incidentally, the number of pieces of preview forming data cached in the cache section 142 is limited to a predetermined number (for example 200). Thus, when the mail obtaining section 102 has obtained 200 electronic mails starting with a newest electronic mail among the electronic mails included in the message list, and the preview generating section 104 has generated preview forming data, the mail obtaining section 102 does not further obtain electronic mails.

The user makes scroll display of the preview list (N in S60), and selects the preview of an electronic mail that the user desires to view (Y in S60). At this time, the command transmitting section 106 transmits the RETR command of the electronic mail identified by the selected preview to the mail server 8. After the mail obtaining section 102 obtains the electronic mail from the mail server 8 (S62), and accumulates the electronic mail in the mail accumulating section 144, the display section 108 displays the mail body on the display device 68 (S64).

(Second Embodiment)

A second embodiment provides a mail application that groups electronic mails and presents the grouped electronic mails to the user. This mail application groups and displays electronic mails including an identical set of the mail address of a sender (From) and the mail address of a destination (To, Cc) in the header information of the electronic mails. In the following, to facilitate understanding, description will be made with the mail address of a sender and the mail address of a destination replaced with the names of the sender and the destination, respectively.

For example, an electronic mail whose sender is A and whose destinations are B and C and an electronic mail whose sender is B and whose destinations are A and C both have a sender and destination set of A, B, and C, and therefore belong to a same group. On the other hand, an electronic mail whose sender is A and whose destinations are B and C and an electronic mail whose sender is A and whose destinations are B, C, and D have different sender and destination sets, and therefore belong to different groups. Thus, the mail application according to the second embodiment groups electronic mails whose sender and destination sets perfectly match each other into one group.

Figure 8:
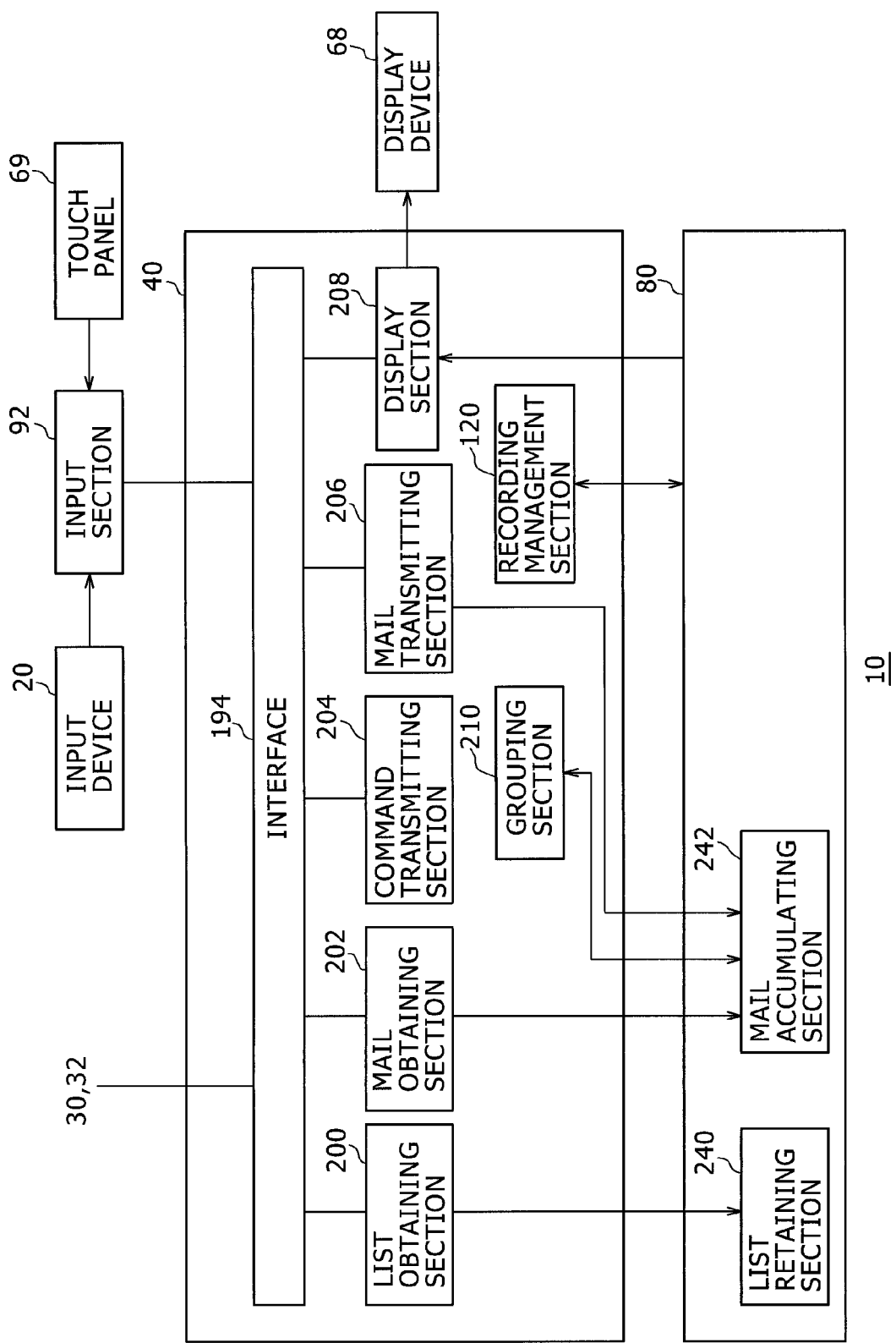
FIG. 8 is a diagram showing functional blocks for performing an electronic mail display function in an electronic mail receiving device according to a second embodiment.

FIG. 8 shows functional blocks for performing an electronic mail display function in an electronic mail receiving device 10 according to the second embodiment. FIG. 8 does not show a main memory 44, a GPU 42, or the like. The electronic mail receiving device 10 includes an input device 20, a touch panel 69, an input section 92, a CPU 40, a recording medium 80, and a display device 68. These configurations are implemented, in terms of hardware components, by the CPU of an arbitrary computer, a memory, a program loaded in the memory, and the like. In this case, however, the functional blocks implemented by cooperation of these components are depicted. Hence, it is to be understood by those skilled in the art that these functional blocks can be implemented in various forms by only hardware, only software, or a combination thereof.

The input section 92 receives operating instructions from the user which instructions are input from the input device 20 and the touch panel 69. The recording medium 80 records thereon data used by the mail application. Incidentally, another recording device, for example the storage 46 may be used in place of the recording medium 80.

The CPU 40 includes an interface 194, a list obtaining section 200, a mail obtaining section 202, a command transmitting section 204, a mail transmitting section 206, a display section 208, a grouping section 210, and a recording management section 120. The respective functions of the interface 194, the list obtaining section 200, the mail obtaining section 202, the command transmitting section 204, the mail transmitting section 206, the display section 208, and the grouping section 210 are implemented by the mail application. The recording management section 120 manages conditions of use of the recording medium 80 by the mail application so as to prevent the capacity used by the mail application from exceeding an upper limit (for example 10 MB).

Incidentally, the recording management section 120 is also provided in the electronic mail receiving device 10 according to the first embodiment. Even when a plurality of mail applications are implemented in the electronic mail receiving device 10, the recording management section 120 manages the conditions of use of the recording medium 80 so as to prevent a total capacity used by the plurality of mail applications from exceeding the upper limit.

When the input section 92 receives a mail application starting instruction, the mail application according to the second embodiment is started. The mail application according to the second embodiment does not generate the previews described in the first embodiment, and therefore performs the authentication procedure, the transaction procedure, and the update procedure shown in FIG. 4. Incidentally, because an upper limit (10 MB) is set to the storage capacity allocated to the mail application, electronic mails transmitted and received by the mail application according to the second embodiment are desirably reduced in electronic mail data size by limiting the number of characters of messages, for example.

The command transmitting section 204 transmits a STAT command and a LIST command from a wireless communication module 30 to a mail server 8 via the interface 194. The command transmitting section 204 also transmits a UIDL command. The list obtaining section 200 obtains a message list (list) including the message number and the number of bytes of each electronic mail from the mail server 8. The list obtaining section 200 also obtains a correspondence list of electronic mail IDs and message numbers which correspondence list is transmitted from the mail server 8 in response to the UIDL command. The list obtaining section 200 records the message list and the correspondence list in a list retaining section 240.

The command transmitting section 204 refers to the lists recorded in the list retaining section 240, and transmits a RETR command from the wireless communication module 30 to the mail server 8 via the interface 194. The mail server 8 extracts an electronic mail having a message number included in the RETR command from a mailbox, and transmits the electronic mail to the electronic mail receiving device 10. The mail obtaining section 202 obtains the electronic mail including header information and a mail body, and accumulates the electronic mail in a mail accumulating section 242. Incidentally, the mail application according to the second embodiment may transmit and receive electronic mails using IMAP (Internet Message Access Protocol).

The grouping section 210 identifies electronic mails accumulated in the mail accumulating section 242 which electronic mails include an identical set of the mail address of a sender and the mail address of a destination in the header information of the electronic mails, and performs grouping. Specifically, the grouping section 210 refers to the mail addresses of a sender (From) and a destination (To, Cc) included in header information, and generates a sender and destination set for each electronic mail. For example, when the sender of a certain electronic mail is A, and the destinations of the electronic mail are B and C, the sender and destination set of the electronic mail is {A, B, C}. In addition, when the sender of another electronic mail is B, and the destinations of the electronic mail are A and C, the sender and destination set of the electronic mail is {A, B, C}. Hence, the sender and destination sets of the two electronic mails perfectly match each other, and the grouping section 210 sorts the two electronic mails into a same group. For example, the grouping section may set a group ID identifying the group, and create a database associating each electronic mail with the group ID.

Incidentally, the electronic mail receiving device 10 allows the user to input a message from the input device 20 or the touch panel 69 and generate a transmission mail. The mail transmitting section 206 identifies a destination and transmits the electronic mail, and accumulates the transmitted electronic mail in the mail accumulating section 242. The grouping section 210 performs grouping including not only received electronic mails but also transmitted electronic mails.

The display section 208 displays groups classified by the grouping section 210 on the display device 68. This GUI (Graphical User Interface) provides a state that looks as if electronic mails were sorted in folders to the user.

Figure 9:
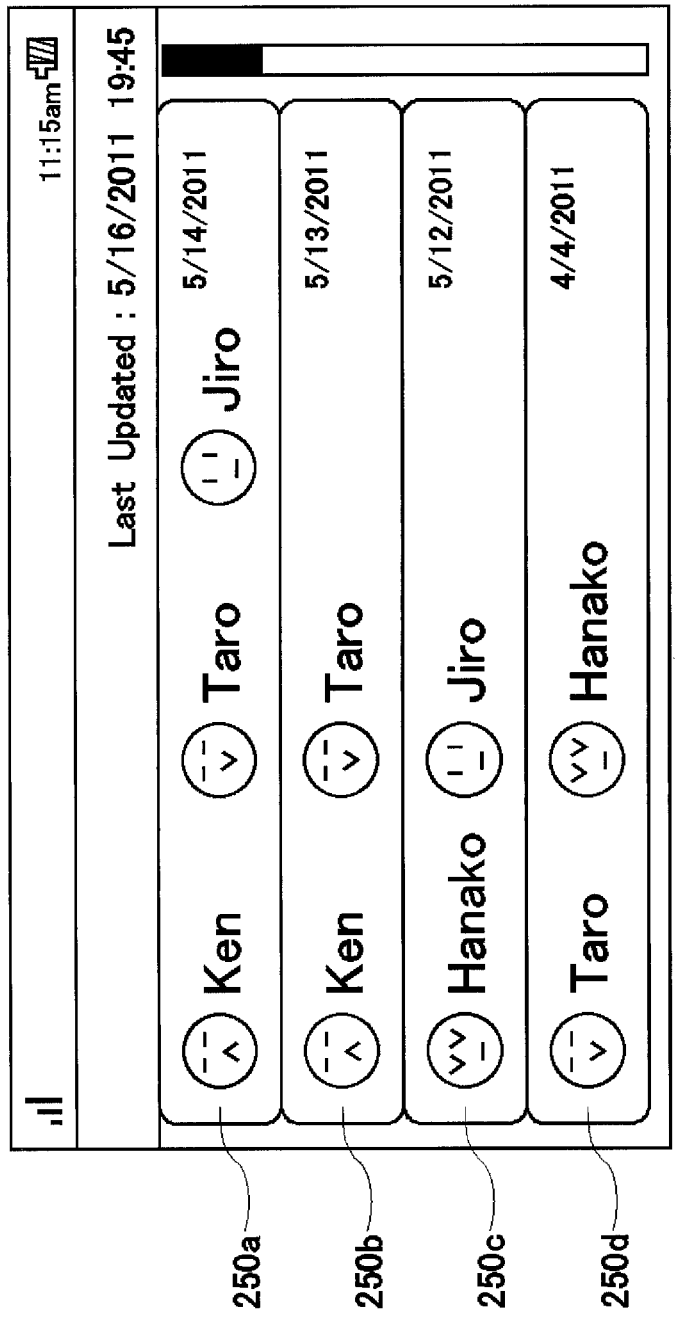
FIG. 9 is a diagram showing an example of display of a group list.

FIG. 9 shows an example of display of a group list. The group list includes group forming information 250a, 250b, 250c, and 250d identifying classified groups. Each piece of group forming information includes the names of members other than the user himself/herself forming the group and icon images of the members. For example, the group forming information 250a indicates that the members forming the group are the user himself/herself, Ken, Taro, and Jiro. The group forming information 250b indicates that the members forming the group are the user himself/herself, Ken, and Taro. The display section 208 arranges and displays the group forming information 250 from a top in descending order of the dates and times of transmission of the newest electronic mails transmitted to the groups.

When the user scrolls the group list by flicking the touch panel 69 in a vertical direction, the group forming information being displayed is changed. The user selects the group forming information 250 whose electronic mails the user desires to view by tapping. In this case, suppose that the group forming information 250b is selected.

Figure 10:
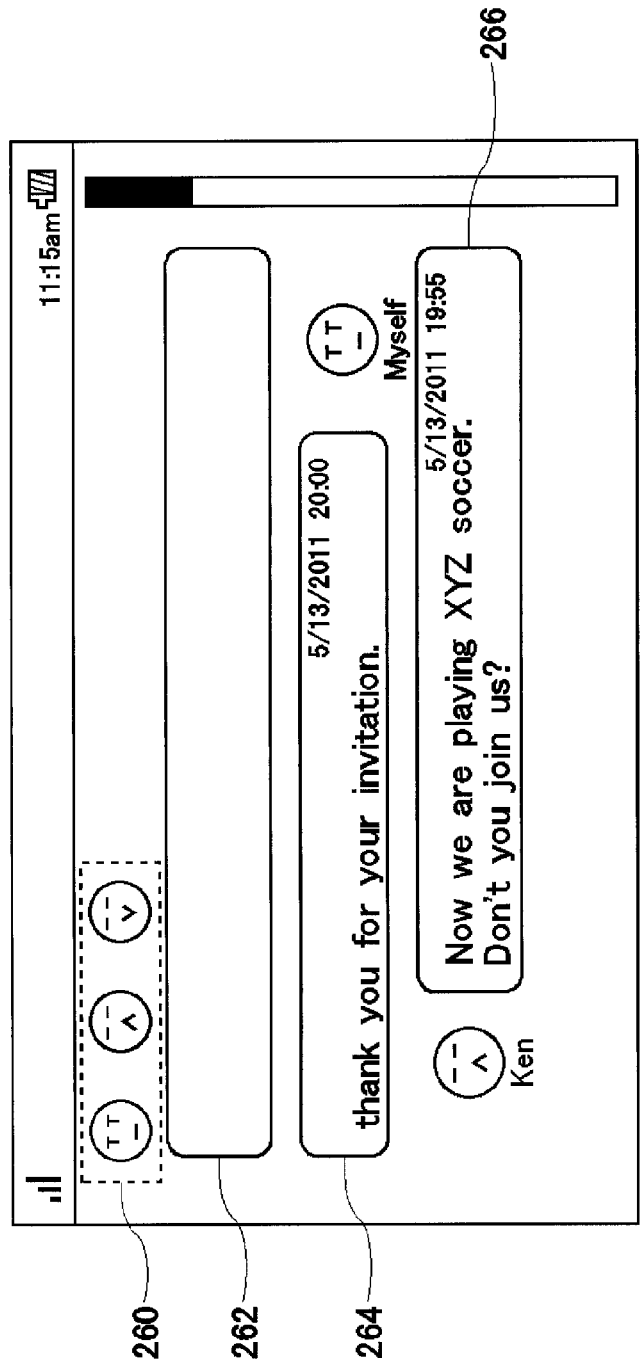
FIG. 10 is a diagram showing an example of a message display screen.

FIG. 10 shows an example of a message display screen. A member icon display region 260 displaying the icon images of the group members is formed on the message screen. In the example of FIG. 10, the icon images of the user himself/herself, Ken, and Taro are displayed in order from a left in the member icon display region 260.

The display section 208 displays the mail bodies of electronic mails transmitted within the group in message display regions 264 and 266. In this case, the message display region 264 displays a message transmitted by the user himself/herself to the other members (Ken and Taro), and the message display region 266 displays a message transmitted by Ken to the user himself/herself and Taro. The display section 208 thus displays the electronic mail transmitted by the mail transmitting section 206 together with the electronic mail obtained by the mail obtaining section 202.

Thus collectively displaying the electronic mails transmitted within the group, including the transmitted mail and the received mail, enables the user to grasp instantly what information communications have been performed within the group.

Incidentally, for easy recognition of the electronic mail transmitted by the user himself/herself or the electronic mail received by the user himself/herself, the display section 208 forms the message display region 264 displaying the transmitted message of the user himself/herself and the message display region 266 of the electronic mail received by the mail obtaining section 202 at positions shifted from each other in a horizontal direction. In the example of FIG. 10, the message display region 266 is formed at a position shifted to a right side by a predetermined length with respect to the message display region 264.

In addition, the icon image of the user himself/herself is displayed on the right side of the message display region 264 displaying the transmitted message of the user himself/herself, and the icon image of the member is displayed on the left side of the message display region 266 displaying the received message. The left and the right may be opposite. However, arranging the icon images of the user himself/herself and the other member on the opposite sides when displaying the icon images and the message display regions in horizontal arrangements can make it easy to determine whether a message is a transmitted message or a received message.

In addition, the display section 208 forms a message writing region 262 for writing a transmission message in a position other than those of the message display regions 264 and 266. The message writing region 262 may be formed in the form of a window. When the display section 208 displays the message writing region 262 on the same screen as that of the message display regions 264 and 266, the user can write a message in the message writing region 262 while viewing the message included in the transmitted mail or the received mail, so that communications within the group can be smoothened.

Figure 11:
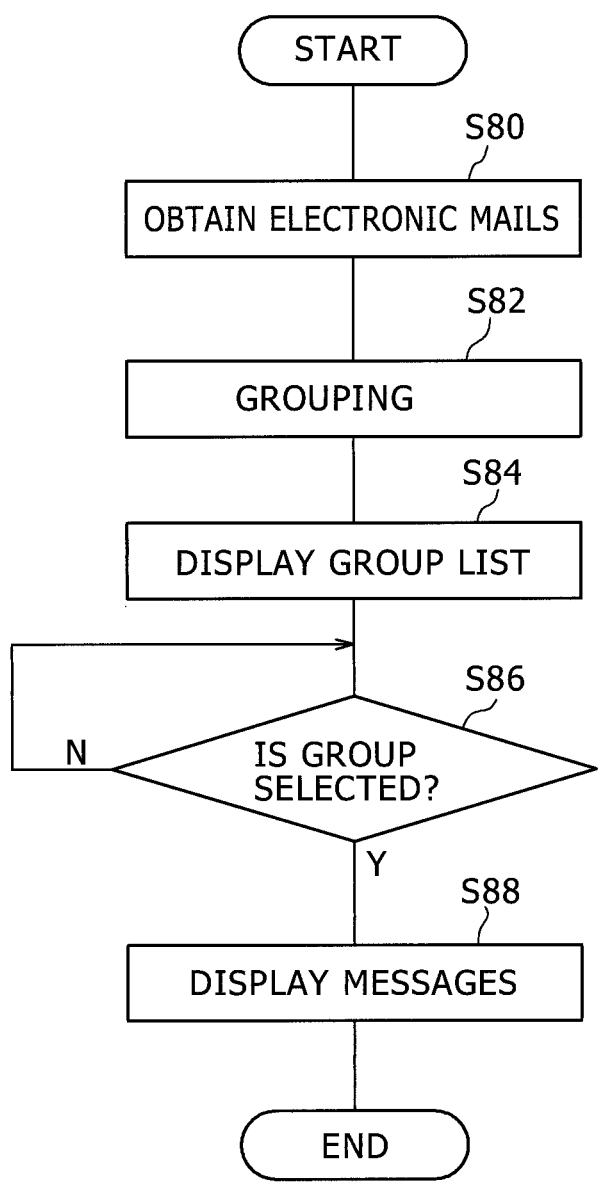
FIG. 11 is a flowchart of a mail display process by a mail application according to the second embodiment.

FIG. 11 is a flowchart of a mail display process by the mail application according to the second embodiment. The mail obtaining section 202 receives electronic mails from the mail server 8, and accumulates the electronic mails in the mail accumulating section 242 (S80). The grouping section 210 identifies electronic mails accumulated in the mail accumulating section 242 which electronic mails include an identical set of the mail address of a sender and the mail address of a destination in the header information of the electronic mails, and performs grouping (S82). The display section 208 displays a group list on the display device 68 (S84).

The user makes scroll display of the group list (N in S86), and selects a group that the user desires to view (Y in S86). The display section 208 extracts electronic mails given the ID of the selected group from the mail accumulating section 242, arranges the electronic mails from a top in descending order of date, and displays the mail bodies of the electronic mails (S88).

The present invention has been described above on the basis of embodiments thereof. The embodiments are illustrative, and it is to be understood by those skilled in the art that combinations of constituent elements and processing processes of the embodiments are susceptible of various modifications and that such modifications also fall within the scope of the present invention.

REFERENCE SIGNS LIST

1 . . . Information processing system, 8 . . . Mail server, 10 . . . Electronic mail receiving device, 40 . . . CPU, 68 . . . Display device, 80 . . . Recording medium, 94 . . . Interface, 100 . . . List obtaining section, 102 . . . Mail obtaining section, 104 . . . Preview generating section, 106 . . . Command transmitting section, 108 . . . Display section, 120 . . . Recording management section, 140 . . . List retaining section, 142 . . . Cache section, 144 . . . Mail accumulating section, 194 . . . Interface, 200 . . . List obtaining section, 202 . . . Mail obtaining section, 204 . . . Command transmitting section, 206 . . . Mail transmitting section, 208 . . . Display section, 210 . . . Grouping section, 240 . . . List retaining section, 242 . . . Mail accumulating section.

INDUSTRIAL APPLICABILITY

The present invention is applicable to a technical field in which electronic mails are processed.

The invention claimed is:

1. An electronic mail receiving device comprising:
a mail obtaining section configured to obtain a plurality of emails from an electronic mail server;
wherein, for each email, the mail obtaining section forcefully terminates a connection with the electronic mail server after a first portion less than a predetermined size threshold of the email has been received,
wherein the first portion includes a header and a message;
a preview generating section configured to generate, for each of the plurality of emails, a preview using the first portions obtained by the mail obtaining section and discarding the first portions after the previews are generated;
a cache section configured to cache the previews generated by the preview generating section;
a display section configured to display the previews in a preview list on a display of the electronic mail receiving device using the previews cached by the cache section; and
a command transmitting section configured to, when a preview included in the preview list is selected by a user using an input device of the electronic mail receiving device, request the electronic mail server to transmit an entirety of the email identified by the selected preview.

2. The electronic mail receiving device according to claim 1, wherein when the display section displays the entirety of the email transmitted from the electronic mail server on the display of the electronic mail receiving device.

3. The electronic mail receiving device according to claim 1 wherein an upper limit is set to a number of previews generated by the preview generating section.

4. The electronic mail receiving device according to claim 1, wherein an upper limit is set to a storage capacity available to the electronic mail receiving device.

5. An electronic mail receiving method comprising:
obtaining a plurality of emails from an electronic mail server using an electronic mail receiving device;
wherein, for each email, the electronic mail receiving device forcefully terminates a connection with the electronic mail server after a first portion less than a predetermined size threshold of the email has been received, wherein the first portion includes a header and a message;

generating, for each of the plurality of emails, a preview using the first portions and discarding the first portions after the previews are generated;

caching the previews;

displaying the previews in a preview list on a display of the electronic mail receiving device; and when a preview included in the preview list is selected, requesting the electronic mail server to transmit an electronic mail identified by the selected preview.

6. A non-transitory computer readable medium having stored thereon a program for a computer having a processor, the program causing computer to perform:

a function of obtaining, by the computer using the processor, a plurality of emails from an electronic mail server, wherein, for each email, the program forcefully terminates a connection with the electronic mail server after a first portion less than a predetermined size threshold of the email has been received, wherein the first portion includes a header and a message;

a function of generating, for each of the plurality of emails, a preview using the first portions and discarding the first portions after the previews are generated;

a function of caching the previews;

a function of displaying the previews in a preview list on a display using the cached previews; and a function of, when a preview included in the preview list is selected, requesting the electronic mail to transmit an electronic mail identified by the selected preview.

* * * * *